United States Patent [19]

King

[11] 4,191,284
[45] Mar. 4, 1980

[54] CLUTCH WITH FLUID ACTUATOR

[76] Inventor: Gerald D. King, Bradfield Canal, Ketchikan, Ak. 99901

[21] Appl. No.: 874,784

[22] Filed: Feb. 3, 1978

Related U.S. Application Data

[63] Continuation-in-part of Ser. No. 677,379, Apr. 15, 1976, abandoned.

[51] Int. Cl.² ............................................. F16D 25/00
[52] U.S. Cl. ............................ 192/85 AA; 92/165 PR
[58] Field of Search ............. 192/85 AA, 85 A, 88 A, 192/86, 85 CA

[56] References Cited

U.S. PATENT DOCUMENTS

| | | | |
|---|---|---|---|
| 1,758,370 | 5/1930 | Olsen et al. | 192/85 AA |
| 1,879,633 | 9/1932 | Olsen et al. | 192/85 AA X |
| 2,684,742 | 7/1954 | Eason | 192/85 AA X |
| 2,891,644 | 6/1959 | Davis | 192/88 A X |
| 3,217,852 | 11/1965 | Brown et al. | 192/88 A X |

*Primary Examiner*—Benjamin Wyche
*Attorney, Agent, or Firm*—Christensen, O'Connor, Johnson & Kindness

[57] ABSTRACT

A fluid operated actuator for activating the clutch mechanism of a clutch-operated cable drum is disclosed wherein the clutch mechanism rotates with a shaft upon which the cable drum is journalled and is operable to engage the cable drum for rotation with the shaft by axially displacing a portion of the clutch mechanism. The actuator, which is cylindrical in geometry and includes a cylindrical bore, is engaged to the end of the rotating shaft with one endwall of the actuator extending radially outward from the rotatable shaft and being adjacent to the axially displaceable portion of the clutch mechanism. A piston is slidably retained in the actuator bore and a number of circumferentially spaced apart thrust pins that are slidably retained in openings of the actuator endwall structurally link the piston with an annular plate that is positioned between the actuator endwall and the axially displaceable portion of the clutch. As fluid pressure is introduced into the cylindrical bore through a rotary fluid coupling in the opposite endwall of the actuator, the piston forces the thrust pins and annular plate against the clutch mechanism to axially displace the clutch mechanism and engage the cable drum to the rotatable shaft.

2 Claims, 3 Drawing Figures

CLUTCH WITH FLUID ACTUATOR

RELATED APPLICATIONS

This application is a continuation-in-part of Application, Ser. No. 677,379, filed Apr. 15, 1976, now abandoned, and entitled AIR OR HYDRAULIC CHAMBER.

BACKGROUND OF THE INVENTION

This invention relates to hydraulic and pneumatic devices and more particularly to a fluid operated actuator for operating a mechanism such as a clutch operated cable drum.

Various rotating devices are known in which the device is actuated by axial displacement of a mechanism which surrounds a rotatable shaft that operates the device. One example of such a device, of particular relevance to this invention, is a clutch operated cable drum in which a cable drum, a clutch and an actuator are operably disposed along a rotatable shaft so that operation of the actuator causes the clutch to mechanically couple the cable drum to the shaft for rotation therewith.

In one such device, identified by the tradename "TAG-MASTER" and manufactured by the Morin Manufacturing Company of West Springfield, Massachusetts, a conventional spool-like cable drum and a clutch assembly are mounted on a cylindrical shaft which is coupled to a rotating member such as the power takeoff unit of earth moving or excavation equipment (i.e., a power shovel or crane). The cable drum is mounted on a central bearing which allows the cable drum to rotate about the cylindrical shaft and the clutch assembly, which is mounted to rotate with the cylindrical shaft, is operable to cause the cable drum to rotate with the shaft.

More specifically, the outer periphery of an annular, substantially flat friction plate is mounted to one sidewall of the cable drum such that the friction plate extends radially inward toward the shaft and is substantially parallel and spaced apart from one sidewall of the cable drum. To couple the friction plate and hence the cable drum to the rotating shaft, the clutch assembly includes an inner friction disc mounted for rotation with the shaft and postioned between one surface of the friction plate and the spaced apart endwall of the cable drum and includes an outer friction disc which is positioned along the second surface of the friction plate with the central portion of the outer friction disc forming an annular projection or shoulder which is slidably received within a central recess in the inner friction disc. In this arrangement, an annular, replaceable friction lining is mounted to each surface of the friction plate and the inner and outer friction disc includes smooth annular contact surfaces comensuarate in area with and positioned in juxtaposition with each friction lining.

Three tension screws which pass through openings in circumferentially spaced apart recesses within the outer friction disc are threadably engaged with openings in the inner friction disc. Compression springs surround each of the tension screws to urge the outer friction disc toward the inner friction disc thereby urging both friction discs into contact with the friction linings of the friction plate. Thus, by adjusting the tension screws, the cable drum can be operatively engaged to rotate with the cylindrical shaft. In this respect, the tension screws are not utilized to effectively lock the cable drum to the rotatable shaft, but are utilized to establish an initial cable tension or "cable pull". For example, when such a cable drum is utilized as a "haul-in drum" wherein cable is manually withdrawn from the cable drum so that the cable can be attached to an object that is to be drawn toward the machine upon which the clutch operated cable drum is mounted, the tension screws are adjusted such that the two friction discs exert only a small amount of force on the friction plate. Thus, the friction plate turns rather readily between the friction discs and the cable can be easily withdrawn from the cable drum.

By presetting the tension screws to exert various cable tension, such a clutch operated cable drum is adaptable to other situations. For example, by adjusting the tension screws to provide on the order of ten pounds of cable tension, a cable drum such as the "TAG-MASTER" can be used as a "dipper trip" wherein the cable is utilized to actuate a bucket or clamshell of conventional excavating and material handling equipment. In such an application, the bucket or other device can be maneuvered by the equipment operator for scooping up earth or other materials and the preset cable tension prevents slack in the cable as the bucket or other device is moved about. Further, setting the tension screws to exert a preset cable tension on the order of 40 to 60 pounds permits use of such a clutch operated cable drum as a "tag-line winder" for use in applications such as the control of a clamshell, grapple, magnet or other device that is suspended from a maneuverable boom by a conventional pulley and cable arrangement.

In each of the above-described utilizations of a clutch operated cable drum, it is necessary that the apparatus be operable to more positively engage the cable drum to the rotatable shaft, i.e., to greatly increase the cable tension at which slippage occurs between the friction plate and the two friction discs. In this regard, in the operation of such a device as a haul-in drum, it is necessary to effectively lock the cable drum to the rotatable shaft so that cable can be wound on the drum to move an object toward the apparatus upon which the clutch operated cable drum is mounted. In a similar manner, the cable drum must be more positively engaged with the rotatable shaft in order to trip a clamshell or bucket to cause dumping of material that has been scooped up and must be more positively engaged with the rotatable shaft for casting, twisting or snubbing a clamshell or other device during tag-line operation.

To permit the equipment operator to more positively engage the cable drum with the rotatable shaft whenever such action is desired or necessary, conventional clutch-operated cable drums such as the above-mentioned TAG-MASTER include an actuator mechanism which axially displaces the outer friction disc toward the cable drum so that the inner and outer friction discs are more positively forced against (tightly squeeze) the friction plate. In this regard, the outer friction disc includes an outwardly projecting annular collar which concentrically surrounds the rotatable shaft and provides a bearing surface on which the required axial force can be applied.

In conventional clutch-operated cable drums such as the TAG-MASTER, the axial displacement required to actuate the device is generally supplied by one or more pairs of cam arms which are located adjacent the outer friction disc and extend outwardly from the end of the rotatable shaft. The portion of each pair of cam arms that surrounds the rotatable shaft is arranged such that the rotatable shaft freely turns therein and thrust washers, generally formed of brass, are positioned between the outermost cam arm and a jam nut or adjusting collar that is threadably engaged with the end of the rotatable shaft and between the innermost cam arm and the annular projection of the radially displacable outer friction disc. A pneumatic or hydraulic piston, mounted between the outer ends of each pair of cam arms is operable to cause the outer ends of the cam arms to be forced apart from one another and the contacting surfaces of the cam arms are contoured such that the thrust washers are urged outwardly along the rotatable shaft as the cam arms are forced apart. Since the outer thrust washer bears against the adjusting collar, the inner thrust washer moves inwardly to axially displace the outer friction disc and thereby cause the inner and outer friction discs to more firmly grip the lining of the friction plate. Thus, by operating a pair of cam arms, the required increase in cable tension is achieved.

Although the overall operation of such a prior art arrangement is generally satisfactory, the complex arrangement of the cam-like actuator mechanism presents several disadvantages and drawbacks. First, the adjusting collar must be carefully adjusted such that the rotatable shaft can freely turn within the cam arms while being simultaneously adjusted such that operation of the pneumatic or hydraulic piston causes the necessary amount of axial displacement. Further, since the thrust washers are subjected to substantial wear, periodic adjustment is required. In addition, to minimize wear of the thrust washers, lubrication of the thrust washers and cam arms is required as often as every four hours of operation. Even further, the cam arm arrangement is not only expensive to manufacture, but improper adjustment of the adjusting collar often occurs and, as a result, the linings of the friction plate are subjected to additional wear and tear.

Accordingly, it is an object of this invention to provide an improved clutch-operated cable drum which includes an actuator mechanism that does not require adjustment or lubrication with every few hours of operation.

It is another object of this invention to provide a fluid operated actuator mechanism for a clutch-operated cable drum or similar device which is relatively simple in structure and economical to manufacture.

Still further, it is an object of this invention to provide a fluid operated actuator for a clutch-operated cable drum which provides the necessary axial displacement of the clutch mechanism without periodic adjustment and without subjecting the clutch lining to undue wear.

SUMMARY OF THE INVENTION

In accordance with this invention, a fluid operated actuator is utilized as a replacement for conventional actuators such as the above-described cam arm and thrust washer arrangement to eliminate troublesome adjustment procedures and the need for lubrication after a few hours of operation.

The fluid operated actuator of this invention is preferably cylindrical and is threadedly engaged with the end of the rotatable shaft to coaxially surround and extend outwardly from the end portion of the shaft. The endwall of the actuator that is positioned in spaced apart juxtaposition with the outer friction disc includes an annular protrusion or shoulder that extends axially toward the outer friction disc. An annular thrust ring surrounds the outer periphery of the shoulder on the actuator endwall and includes a number of circumferentially spaced apart thrust pins that are slidably received in openings of the actuator endwall which pass into a cylindrical bore that is defined within the interior region of the actuator. A piston, slidably retained within the cylindrical bore, abuts the outward ends of the thrust pins.

In operation, fluid pressure is introduced into the cylindrical bore via a rotary fluid coupling that is mounted to the central region of the outermost endwall of the actuator. This fluid pressure urges the piston along the cylindrical bore to drive the thrust ring parallel to the rotatable shaft to, in turn, axially displace the outer friction disc and positively engage the cable drum for rotation with the shaft.

Since the actuator of this invention rotates with the shaft, little or no wear occurs and the actuator requires little or no lubrication. Further, since the force exerted on the clutch mechanism is dependent only on the fluid pressure that is introduced into the actuator and the dimensioning of the thrust pins, no periodic adjustment is necessary.

BRIEF DESCRIPTION OF THE DRAWING

Other objects and advantages of the present invention will be apparent to one skilled in the art after reading of the following description taken together with the accompanying drawing in which.

DETAILED DESCRIPTION

Figure 1:
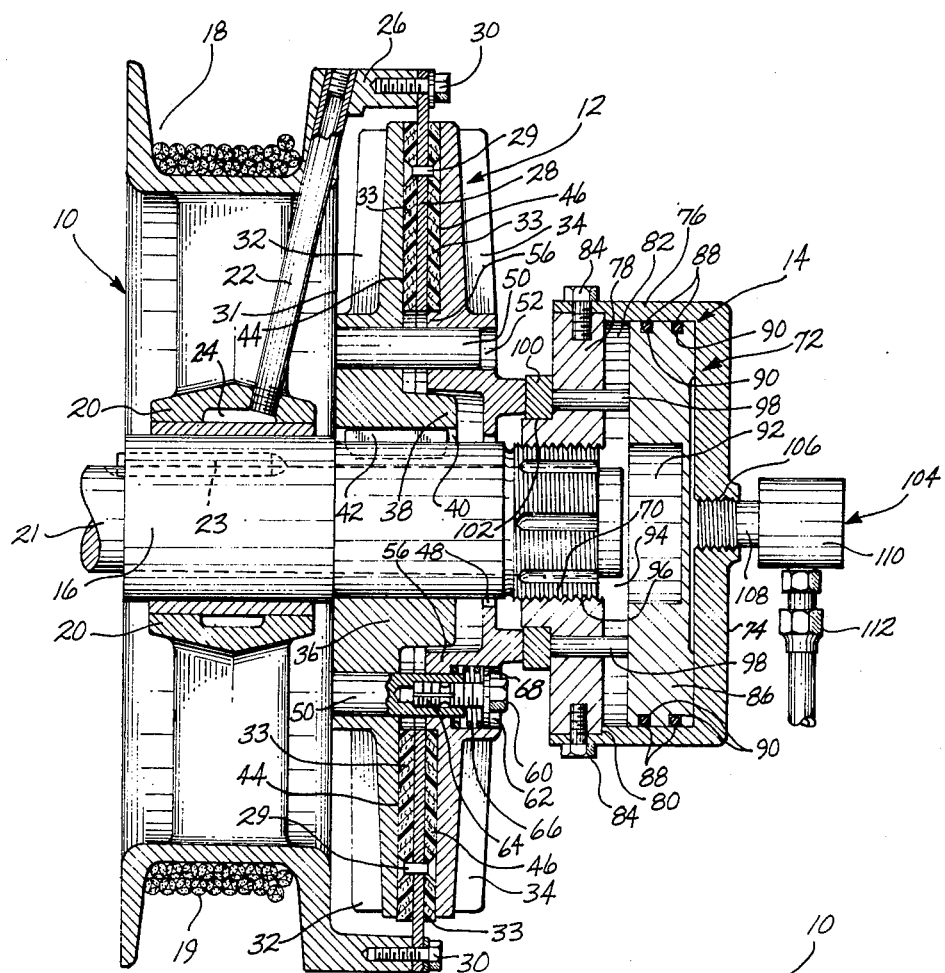
FIG. 1 is a cross-sectional view of a clutch operated cable drum employing a fluid operated actuator of this invention.
Figure 2:
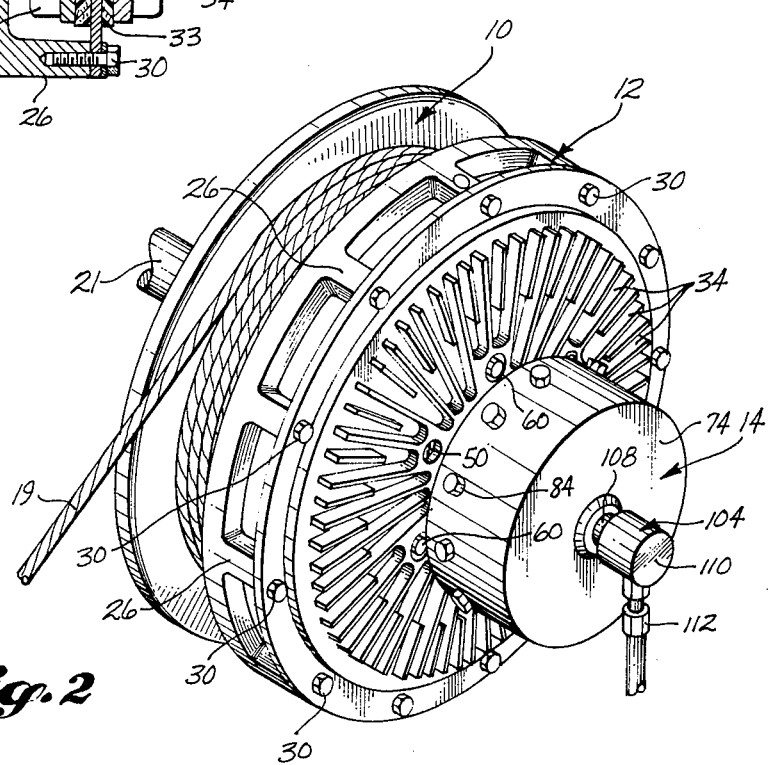
FIG. 2 is an isometric view of the clutch-operated cable drum of FIG. 1.

FIGS. 1 and 2 illustrate a clutch operated cable drum constructed in accordance with this invention to include a cable drum 10, a clutch 12 and a fluid operated actuator 14 which are disposed in operable relationship with one another along a cylindrical shaft 16. In this arrangement, the cable drum 10 is spool-like in geometry having an annular recess 18 along the outer circumference for the containment of a cable 19 that winds or unwinds as the cable drum 10 is rotated. A bearing 20, which is pressed into or otherwise retained in the central opening of the cable drum 10 permits the cable drum to freely rotate about the cylindrical shaft 16 and a drive shaft 21 of equipment such as a power takeoff unit of the apparatus which utilizes the depicted cable drum arrangement passes through the central opening of the cylindrical shaft 16 with a Woodruff key 23 or other conventional device locking the drive shaft 21 to the cylindrical shaft 16. An oil tube 22 extends downwardly from one rim of the cable drum 10 into an oil groove 24 to permit periodic lubrication of the bearing 20.

To enable the cable drum 10 to be operatively coupled to the cylindrical shaft for rotation therewith, the outer portion of one of the radially extending boundary surfaces 31 of the cable drum 10 includes a plurality of spaced apart protrusions 26 that extend substantially parallel to the cylindrical shaft 16. An annular, substantially flat friction plate 28 having an outer diameter commensurate with the circular pattern formed by the spaced apart protrusions 26, is affixed to the cable drum 10 by removable fasteners or screws 30. Each of the screws 30 pass through a suitably sized opening in an outwardly located circumferential region of the friction plate 28 and engage with an internally threaded opening in one of the protrusions 26. Thus, the friction plate 28 extends radially inward toward the cylindrical shaft 16, being substantially parallel to and spaced apart from the radially extending boundary surface 31 of the cable drum 10. Replaceable friction linings 33, of annular geometry, are mounted to each radially extending surface of the friction plate 28 with the friction linings 33 being secured to the friction plate 28 by rivets 29 or other conventional bonding techniques. Material suitable for forming the friction linings 33 are well known in the art and include those materials commonly utilized for clutch facings and brake linings.

To cause the friction plate 28 and hence the cable drum 10 to rotate with the cylindrical shaft 16, the clutch 12 includes an inner friction disc 32 and an outer friction disc 34 mounted to rotate with the cylindrical shaft and operable for frictional engagement with the friction linings 33 of the friction plate 28. More explicitly, the inner friction disc 32 extends radially outward from the cylindrical shaft 16 in the region formed between the cable drum boundary surface 31 and the spaced apart surface of the inwardly extending friction plate 28. The central region of the inner friction disc 32 includes a hub-like region or shoulder 38 that extends axially along the cylindrical shaft 16 and away from the cable drum 10. The opening through the hub-like region 38 which accommodates the cylindrical shaft 16 includes an axially extending slot 40 positioned in alignment with a corresponding axial slot in the surface of the cylindrical shaft 16. A locking device, such as a Woodruff key 42, is installed in the slot 40 to securely interconnect the inner friction disc 32 with the cylindrical shaft 16. Additionally, an annular contact region 44, which is substantially commensurate in area with the annular friction lining 33 is machined or otherwise formed in the outer region of that boundary surface of the inner friction disc 32 which is adjacent to and faces the friction lining 33 of the friction plate 28.

The outer friction disc 34 extends radially outward from the cylindrical shaft 16 along the second radially extending boundary surface of the friction plate 28. Like the inner friction disc 32, the outer friction disc 34 includes an annular contact region 46 formed in that portion of the outer friction disc 34 which is in juxtaposition with the friction lining 33 of the friction plate 28. As can be most clearly seen in FIG. 1, the cylindrical shaft 16 is not directly connected to the outer friction disc 34, but passes through a central opening 48 in the outer friction disc 34 with the opening 48 being of greater diameter than the cylindrical shaft 16. To link the inner and outer friction discs (32 and 34) and thereby cause the outer friction disc 34 to rotate with the cylindrical shaft 16, a number of circumferentially spaced apart guide pins 50 are pressed into or otherwise retained in the inner friction disc 32.

Each guide pin 50 is substantially parallel to the cylindrical shaft 16 and projects into an associated opening 52 of the outer friction disc 34, which openings 52 are sized to permit the outer friction disc to be moved along the cylindrical shaft toward or away from the inner friction disc 32. To further maintain the outer friction disc 34 in operative alignment with the inner friction disc 32, the outer friction disc 34 includes an annular shoulder 56 which is dimensioned to extend inwardly into the annular region formed between the hub 38 and the inner periphery of the friction plate 28.

In view of the above-described arrangement of the cable drum 10 and clutch 12, it can be recognized that axial translation of the outer friction disc 34 in the direction toward the inner friction disc 32 urges both the inner friction disc contact region 44 and outer friction disc contact region 46 into contact with the friction linings 33 to thereby operatively couple the cable drum 10 to the cylindrical shaft 16. Thus, when the depicted arrangement is interconnected with the power driven rotating shaft 21, axial displacement of the outer friction disc 34 will cause the cable drum 10 to rotate or, upon reaching a cable tension which causes the friction linings 33 of the friction plate 28 to slide across the inner and outer friction discs (32 and 34), to maintain substantially constant tension in the cable 19.

In utilizing a clutch-operated cable drum arrangement of the above-described type, it is often necessary to vary the pressure exerted on the friction linings 33 of the friction plate 28 by the inner and outer friction discs 32 and 34 to thereby control the cable tension at which slippage occurs between the friction discs and the friction linings. In particular, it is often necessary to utilize a preselected cable tension during portions of an operational sequence and simultaneously provide for more positive engagement between the shaft 16 and cable drum 10 during other portions of such operation. For example, when such an arrangement is utilized as a haul-in drum to winch or hoist various objects, it is often necessary to permit the cable 19 to be withdrawn from the cable drum 10 with relative ease (at very low cable tension) so that a person or the force of gravity can extend the cable by a desired amount. On the other hand, once the cable has been connected to the object to be moved, the cable drum 10 must be positively engaged with the shaft 16 to wind the cable 19 onto the cable drum 10 and draw the object toward the equipment utilizing the clutch-operated cable drum. Similarly, in utilizing such apparatus to activate or trip buckets or scoops such as those used on conventional excavating equipment, it is necessary that the cable 19 is maintained under a preset tension which is sufficient to prevent slack from occurring as the cable 19 unwinds from the cable drum 10 yet does not activate the dump mechanism of the controlled bucket or scoop until the operator activates the clutch mechanism to more positively engage the cable drum 10 with the rotatable shaft 16. In still other applications, such as use of a clutch-operated cable drum as a tag-line winder for manipulating a clamshell, grapple or magnet in conjunction with equipment such as a crane, it is necessary to provide an initial cable tension that is greater than that necessary in the above-mentioned applications and to increase the cable tension during casting, twisting or snubbing of such a clamshell or other device.

To establish a selectable preset cable tension, the depicted arrangement includes a number of tension screws 60 which draw the inner and outer friction discs 32 and 34 toward one another so that the annular contact regions 44 and 46 press against the friction linings 33. In the particular arrangement depicted in FIGS. 1 and 2, three circumferentially spaced apart tension screws 60, which pass into and are engaged with three of the guide pins 50, are utilized. As can be seen in FIG. 1, each tension screw 60 is positioned in a counterbore 62 that extends inwardly along an associated guide pin opening 52 of the outer friction disc 34 with each tension screw 60 being engaged with an internally threaded opening 64 in the guide pin 50 that passes through the opening 52 and into the counterbore 62. A compression spring 66, located in the counterbore 62 and circumferentially surrounding the guide pin 50, extends between a washer 68 that is retained by the head of the adjustment screw 60.

By tightening tension screws 60 by an equal amount, the inner friction disc 32 and outer friction disc 34 are urged toward one another such that a predetermined cable tension is required in order to cause slippage between the friction plate friction linings 33 and the annular contact regions 44 and 46 of the inner and outer friction discs (32 and 34). Accordingly, the tension screws 60 can be adjusted to establish the preset cable tension required in the above-mentioned applications of a clutch-operated cable drum as a haul-in drum, dipper trip and tag-line.

It will be recognized by those skilled in the art that the above-described portion of the depicted clutch operated cable drum is known in the art. For example, one such device is manufactured by the Morin Manufacturing Company, West Springfield, Massachusetts under the tradename TAG-MASTER.

Although the prior art arrangements satisfactorily effects the above-described operation, the device utilized heretofore to urge the outer friction plate 34 toward the inner friction plate 32 when the cable drum 10 is to be more positively engaged with the shaft 16 to thereby increase the cable tension at which slippage occurs or to thereby effectively lock the cable drum 10 to the shaft 16 has not proven entirely satisfactory. More specifically, such prior art clutch-operated cable drum arrangements do not utilize the fluid operated actuator 14 of FIGS. 1–3, but employ apparatus such as one or more pairs of cam-like arms that extend radially outward from the end of the shaft 16 with the inner portion of the cam arms overlapping one another and an opening within this region of each cam arm permitting the shaft 16 to rotate without turning the cam arms. The cam arms are retained on the shaft 16 by a jam nut or adjusting collar which is threadedly engaged with the threaded end regions 70 of the shaft 16 and thrust washers, generally constructed of brass, are positioned between the cam arms and the outer friction disc 34 and between the cam arms and the adjusting collar. Further, the overlapping, contacting regions of the inner portion of the cam arms are contoured such that the thrust washers are urged outwardly along the shaft 16 as the outer ends of the cam arms are forced angularly away from one another by a hydraulic or pneumatic piston. Since the adjustment collar prevents the cam arms and thrust washers from moving away from the outer friction disc 34, forcing the cam arms away from one another moves the outer friction disc 34 toward the inner friction disc 32 to increase the frictional engagement between the friction discs 32 and 34 and the friction plate 28. Accordingly, when the adjustment collar is properly set, operation of the cam arms causes the clutch 12 to be activated so that the cable drum 10 is more positively enegaged for rotation with the shaft 16.

This prior art arrangement for activating the clutch 12 has several disadvantages and drawbacks. For example, since the cylindrical shaft 16 rotates and the cam arms must remain stationary during such rotation, the adjusting collar of the prior art device must be carefully installed such that excessive rotational force is not coupled to the cam arms. To maintain freedom of rotational movemeint between the cam arms and the adjacent rotating components (adjusting collar, shaft 16, and outer friction disc 34) and prevent excessive wear of the thrust washers and cams, this arrangemnt should be lubricated approximately every four hours of operation. Even with proper lubrication and initial adjustment, the thrust washers are subjected to substantial wear as they are forced against the rotating adjusting collar and outer friction disc. Thus, to maintain proper operation of the clutch 12 with the displacement caused by a particular hydraulic or pneumatic piston, the adjusting collar must be periodically tightened by an appropriate amount. Further, since the configuration of a conventional hydraulic piston suitable for use in such an arrangement often differs from that of a conventional pneumatic piston, separate pairs of cam arms may be necessary for hydraulic and pneumatic operation.

Figure 3:
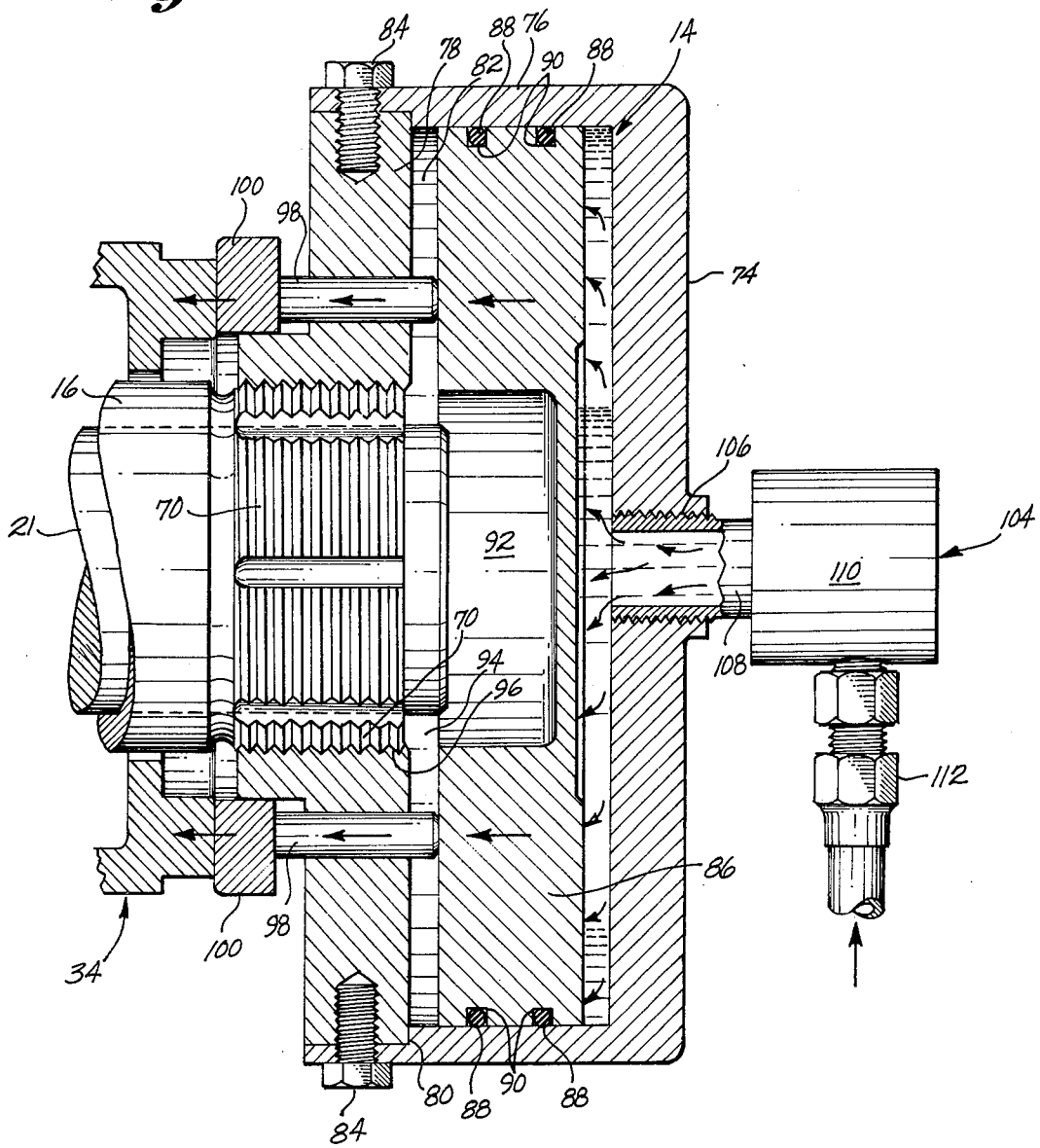
FIG. 3 is an enlarged cross-sectional view of the fluid operated actuator of this invention.

The above-described disadvantages and drawbacks and eliminated in the practice of this invention by the fluid operated actuator 14 of FIGS. 1–3. Referring particularly to FIGS. 1 and 3, the actuator 14 includes a cup-shaped outer housing 72 having a circular endwall 74 and a cylindrical boundary wall 76 which extends orthogonally from the outer periphery of the endwall 74. An endplate 78, substantially circular in geometry, mates with a circular recess 80 formed in the open end of the outer housing 72 to define a fluid-tight cylindrical chamber or bore 82. For example, in the depicted arrangement, the endplate 78 is joined to the outer housing 72 by a number of capscrews 84 which are spaced apart from one another along the end region of the circular boundary wall 76 and pass through suitably sized openings to engage internally threaded openings in the endplate 78.

A piston 86 is slidably retained within the chamber 82 with the outer boundary of the piston 86 and the interior surface of the cylindrical wall 76 being machined to prevent fluid leakage between the piston and the chamber wall. To further prevent such leakage, the depicted embodiment includes two sealing rings 88 which are installed in grooves 90 that extend around the periphery of the piston 86. The sealing rings 88 are preferably constructed of neoprene or other suitable material and are slightly compressed between the chamber wall 76 and the grooves 90. Further, a circular recess 92 is included in the piston surface 94 that faces the endplate 78 to prevent the piston from striking the outer end of the shaft 21 when the actuator 14 is installed to the rotatable shaft 16.

The endplate 78 includes a central opening 96 which is internally threaded for engaging the threaded end regions 70 of the rotatable shaft 16. A plurality of circumferentially spaced apart thrust pins 98 are slidably received in suitable sized openings in the endplate 78. As can be seen in both FIGS. 1 and 3, each thrust pin 98 is substantially parallel to the shaft 16 and is interconnected with an annular thrust ring 100 which surrounds a shoulder 102 of the endplate 78. If desired or necessary, one or more set screws (not shown in the drawing) can be installed in threaded openings in the shoulder 102 to effectively lock the actuator 14 to the shaft 16.

Viewing the above-described arrangement of the actuator 14, it can be recognized that forcing the piston 86 toward the endwalls 78 causes the thrust pins 98 and the annular thrust ring 100 to travel toward and axially displace the outer friction disc 34 in the manner required to provide the previously described positive engagement to the cable drum 10 to the rotatable shaft 16. To provide the force requirement to move the piston 86, the actuator 14 includes a conventional rotary fluid coupling 104, such as that type of coupling commonly called a "roto-union", which is installed in an internally threaded opening 106 located at the center of the outer housing boundary wall 74. As is known in the art, such a rotary fluid coupling includes a fluid conduit 108 that is retained in a fitting 110 such that the fluid conduit 108 can freely rotate while the fitting 110 is maintained in a stationary position. Accordingly, as the operator causes fluid pressure (pneumatic or hydraulic) to be introduced into the rotary fluid coupling 104 from a conventional fluid supply line 112, the piston 86 is forced toward the outer friction plate 34 to thereby operate the clutch 12 in the desired manner. Since the amount of axial displacement caused by the piston 86 depends on the magnitude of the fluid pressure, with the maximum axial displacement being determined by the depth of the cylindrical chamber 82, it can be recognized that the actuator 14 can be suitably dimensioned and arranged to provide a desired degree of engagement of the cable drum 10 to the rotatable shaft 16.

The embodiments of the invention in which an exclusive property or privilege is claimed are defined as follows:

1. A fluid operated actuator for operating a rotatable device of the type wherein said device is engaged for rotation with a shaft by axially displacing an annular region of said device which concentrically surrounds said shaft and wherein the end portion of said shaft includes threads, said actuator comprising:

housing means configured for engagement with said shaft of said device to be operated, said housing means including an outer housing of cylindrical configuration having a substantially closed end and an open end of substantially circular geometry, the central opening of said outer housing defining a cylindrical bore, said housing means further including an endplate of substantially circular geometry, said endplate being dimensioned and arranged for mounting within said open end of said outer housing, said endplate including an internally threaded opening dimensioned and arranged for engagement with said threaded end region of said shaft of said rotatable device, said endplate including a plurality of circumferentially spaced apart openings symmetrically arranged about said internally threaded opening, said endplate further including an annular shoulder surrounding said internally threaded opening and projecting outwardly toward said rotatable device;

a piston slidably received within said cylindrical bore of said housing means, said piston including a recess of circular geometry for receiving any portion of said threaded end region of said shaft that extends into said bore when said piston is forced along said cylindrical bore to operate said rotatable device;

a plurality of thrust pins, each of said thrust pins slidably received within an individual opening of said plurality of circumferentially spaced apart openings of said endplate of said housing means;

a thrust ring, said thrust ring being substantially flat and being of annular geometry, said thrust ring being mounted to said plurality of thrust pins in concentric spaced apart relationship with said shaft of said rotatable device, the inner diameter of said thrust ring being commensurate in diameter with the outer diameter of said annular shoulder of said endplate to maintain said thrust ring in alignment with said shaft during axial displacement of said thrust ring;

a rotary fluid coupling mounted in the central portion of said closed end of said outer housing, said rotary fluid coupling for supplying fluid pressure to said cylindrical bore to force said piston along said cylindrical bore, said piston urging said thrust pins outwardly through said circumferentially spaced apart openings of said housing means to axially displace said thrust ring along said shaft, said axial displacement of said thrust ring operating said rotatable device.

2. In a clutch operated cable drum of the type which includes a spool-shaped cable drum mounted for rotation about a shaft that passes through a central opening of the cable drum and includes a clutch mechanism that is mounted for rotation with the shaft at a position adjacent said cable drum, said clutch being operable to frictionally engage said cable drum for rotation with said shaft, when a portion of said clutch mechanism is axially displaced along said shaft in the direction of said cable drum, said shaft having a threaded end region extending outwardly from said clutch mechanism, improved actuator means for axially displacing said portion of said clutch mechanism, said improved actuator means comprising:

a housing mounted to said shaft for rotation therewith at a position adjacent to said clutch mechanism, said housing being of a substantially circular cross-sectional geometry and including a substantially cup-shaped outer housing defined by a cylindrical wall section that extends orthogonally outward from the periphery of a first circular endwall, said housing including a second endwall positioned adjacent to said clutch mechanism and removably mounted within the open end of said outer housing to define a cylindrical chamber having an axial centerline substantially coincident with the axial centerline of said shaft, said second endwall including an internally threaded opening for engagement with said threaded end region of said shaft and a plurality of circumferentially spaced apart openings concentrically surrounding said shaft, said second endwall further including an annular shoulder surrounding said internally threaded opening and extending outwardly toward said clutch mechanism;

a piston of substantially cylindrical geometry, said pison slidably received within said cylindrical chamber for movement between said first and second endwalls and including a recessed region for receiving any portion of said threaded end region of said shaft that extends into said cylindrical chamber when said piston is moved toward said second endwall of said housing;

a plurality of cylindrical thrust pins, each of said thrust pins slidably received within an associated opening of said plurality of said openings in said second endwall of said housing with each of said thrust pins being substantially parallel to said shaft, one end of each of said thrust pins being positioned in abutment with said piston;

a substantially flat thrust ring concentrically surrounding said shaft and slidably received on said annular shoulder of said second endwall of said housing, one surface of said thrust ring being affixed to the second end of each of said thrust pins; and, a rotary fluid coupling mounted to said first endwall of said housing, said rotary fluid coupling being in fluid communication with said cylindrical chamber for introducing fluid pressure into said chamber to move said piston toward said housing second wall, said movement of said piston toward said second wall forcing said thrust pins and said thrust ring in a direction substantially parallel to the axial centerline of said shaft with said thrust ring axially displacing said portion of said clutch mechanism to engage said cable drum with said shaft.

* * * * *